United States Patent [19]

Reinfelder

[11] Patent Number: 4,857,734
[45] Date of Patent: Aug. 15, 1989

[54] READ SYSTEM FOR A LUMINESCENT IMAGE STORAGE SCREEN IN AN X-RAY DIAGNOSTICS INSTALLATION

[75] Inventor: Hans-Erich Reinfelder, Erlangen, Fed. Rep. of Germany

[73] Assignee: Siemens Aktiengesellschaft, Berlin and Munich, Fed. Rep. of Germany

[21] Appl. No.: 33,264

[22] Filed: Apr. 2, 1987

[30] Foreign Application Priority Data

Apr. 21, 1986 [DE] Fed. Rep. of Germany ....... 3613370

[51] Int. Cl.$^4$ ............................................ G01N 23/04
[52] U.S. Cl. .................................. 250/327.2; 378/62; 378/99
[58] Field of Search .................... 250/327.2, 484.1; 378/62, 98, 99; 358/111

[56] References Cited

U.S. PATENT DOCUMENTS 3,668,396 6/1972 Asers et al. .......................... 378/98
4,485,302 11/1984 Tanake et al.
4,606,064 8/1986 Haendle.

FOREIGN PATENT DOCUMENTS 0176492 4/1986 European Pat. Off.
WO 80/02785 12/1980 PCT Int'l Appl.

OTHER PUBLICATIONS

*Analog–Digital Conversion Notes*, Analog Devices, Inc., p. 69, 1977.
"Thermoluminescence Dosimetry with Photon Counting," Schlesinger et al., IEEE Transactions Nuclear Science, vol. NS–19, No. 3, Jun. 1972, pp. 34–38.

*Primary Examiner*—Carolyn E. Fields
*Assistant Examiner*—David P. Porta
*Attorney, Agent, or Firm*—Hill, Van Santen, Steadman & Simpson

[57] ABSTRACT

A read system for a luminescent image storage screen in an x-ray diagnostics installation, the luminescent screen latently storing an x-radiation image, includes a source of readout radiation which excites the storage screen to luminesce, a photo-multiplier detector which receives light emitted by the storage luminescent screen and converts the incident light into electrical signals in the form of a pulse sequence having a pulse rate dependent on the brightness incident on the light-sensitive entry face of the photo-multiplier, and a counter which counts the pulses at the output of the detector. The output of the counter is supplied to a monitor through a converter for generating a visual image.

3 Claims, 1 Drawing Sheet

READ SYSTEM FOR A LUMINESCENT IMAGE STORAGE SCREEN IN AN X-RAY DIAGNOSTICS INSTALLATION

BACKGROUND OF THE INVENTION

1. Field of the Invention

The present invention is directed to x-ray diagnostics installations having an x-ray converter with a luminescent image storage screen, and in particular to a read system for reading the image from the storage screen and generating a visual image therefrom.

2. Description of the Prior Art

An x-ray diagnostics installation is disclosed in U.S. Pat. No. 4,485,302 having an x-ray converter with a luminescent sceen which latently stores the x-radiation image, and which has a read-out system for the screen which causes the storage screen to luminesce by emitted rays of an additional read-out radiation source. The read-out system includes a detector for acquiring light emitted by the luminescence screen, and which converts the optical signals into electrical signals, which are then reproduced on a monitor. As disclosed in the patent, the luminescence screen consists of a storage luminophore functioning as a radiation-sensitive transducer when irradiated with x-rays, causing the generation of electrons which are stored in potential wells or traps having a higher surrounding energy level. During read-out, the storage luminescence screen is scanned pixel-by-pixel by an additional radiation source, for example, by a laser, so that the electrons stored in the traps are excited and can fall back into lower energy levels, the energy difference being emitted as a light quantum.

During scan of a line by the laser beam, the light emitted from the storage screen is acquired by a light conductor optics and is projected onto the light-sensitive entry face of a detector. The output signal of the detector is supplied to a conventional video chain for reproduction of the x-ray image.

In conventional systems, a photo-multiplier is used as the detector, the photo-multiplier converting the individual light quanta into a quasi-continuous current signal. The detector system thus has inherent inertia such that a chronological resolution of the individual events is not possible, nor is this type of resolution desired. The continuous analog signal generated as described above is supplied to an analog-to-digital converter in a standard manner, the analog-to-digital converter converting the magnitude of the generated voltage or of the current into a digital number. After further processing, the digital signal is again converted into an analog signal in a digital-to-analog converter. This analog signal is capable of being reproduced on a monitor. Thus a continuous signal is generated from a discrete pulse sequence, this continuous signal being in turn converted into discrete numerical values. Errors arise as a consequence of the analog processing, particularly due to the characteristic of the detector and of the amplifier. Errors also arise due to the necessity for multiple conversions. Such errors must be eliminated, insofar as possible, by suitable calibration.

SUMMARY OF THE INVENTION

It is an object of the present invention to provide an x-ray diagnostics installation having a luminescent image storage screen wherein, during read-out of the screen, a signal corresponding to the light incident on the entry face of the detector is obtained directly without digital conversion. The above object is achieved in accordance with the principles of the present invention by the use of a detector which is a photo-multiplier which generates a pulse sequence at a pulse rate which is dependent on the brightness (luminescence intensity) incident on the light-sensitive entry face of the photo-multiplier, and by the use of a counter which counts the pulses at the output of the detector. The counter is connected to a television monitor through a converter stage. Such an extremely fast photomultiplier thus acquires the individual light quanta emitted by the storage luminscence screen, the number of light quanta being identified by the counter so that a signal corresponding to the brightness of the emitted light is present at the output of the counter. This signal is capable of being reproduced on the television monitor through a converter as brightness-modulated picture elements.

In a preferred embodiment, the detector is a signal-photon photo-multiplier which generates one pulse for every photon incident on its light-sensitive entry face. It is preferable, to adapt the photo-multiplier to th counter, to provide a pulse amplifier between those two components. It is also preferable, for eliminating noise of the photo-multiplier and of the pulse amplifier, to provide a pulse discriminator between the output of amplifier and the input of the counter.

DESCRIPTION OF THE PREFERRED EMBODIMENTS

Figure 1:
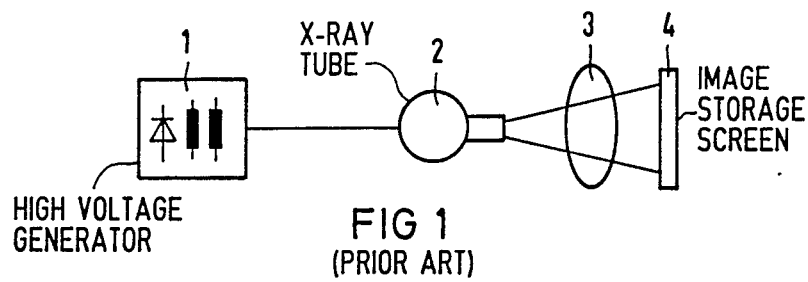
FIG. 1 is a schematic diagram showing components of a conventional x-ray diagnostics installation for generating an image on a luminescent storage screen.

A portion of a conventional x-ray diagnostics installation is shown in FIG. 1, including a high voltage generator 1 which feeds an x-ray tube 2 which emits x-rays penetrating a patient 3. The x-rays attenuated by the patient are incident on a luminescent storage screen 4. The incident radiation generates electrons in the storage luminescent screen 4, which are stored in potential traps or wells of the luminophore, so that a latent image is stored in the screen.

Figure 2:
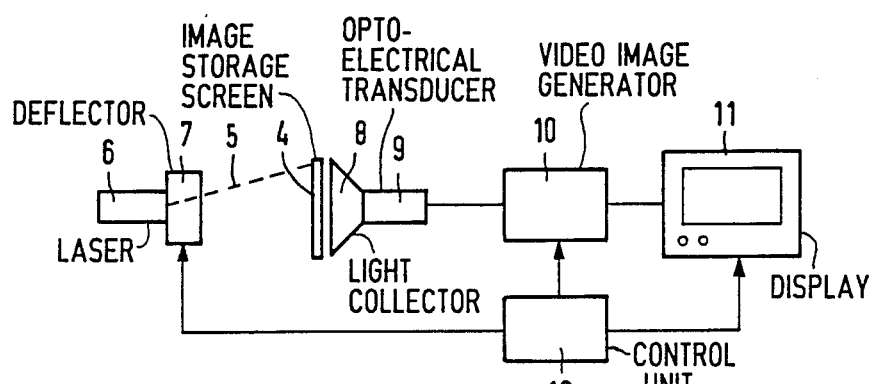
FIG. 2 is a schematic diagram of components of a conventional x-ray diagnostics installation for reading the image stored on the storage screen and generating a video image tnerefrom.

For reproduction of the latent image, the storage screen 4 is scanned pixel-by-pixel by a laser beam 5 generated by a laser 6, which is swept over the surface of the screen for line-by-line by a deflector 7, as shown in FIG. 2. The deflector 7 for the laser 6 may, for example, be a combination of a deflection mirror for vertical deflection and an electro-optical beam deflector for horizontal deflection. The vertical deflection, however, may alternatively be achieved by parallel feed of the luminscent screen 4 perpendicular to the scan line. Due to the scanning with the laser beam 5, all picture elements on the luminescent screen 4 are successively excited line-by-line and caused to luminesce. A light conductor optics element 8 collects the light emitted by the storage screen 4 and conducts it onto an opto-electrical transducer 9, which detects the brightness of the scanned picture elements and converts those values into an electrical signal supplied to a video image generator circuit 10, which generates a video signal from the individual analog output signals of the transducer 9 for display on a monitor 11. The circuit 10 may include an image memory, processing circuits, and analog-to-digital and digital-to-analog converters. A control unit 12 generates control clock signals for synchronizing the deflector 7, the video image generator circuit 10, and the monitor 11.

Figure 3:
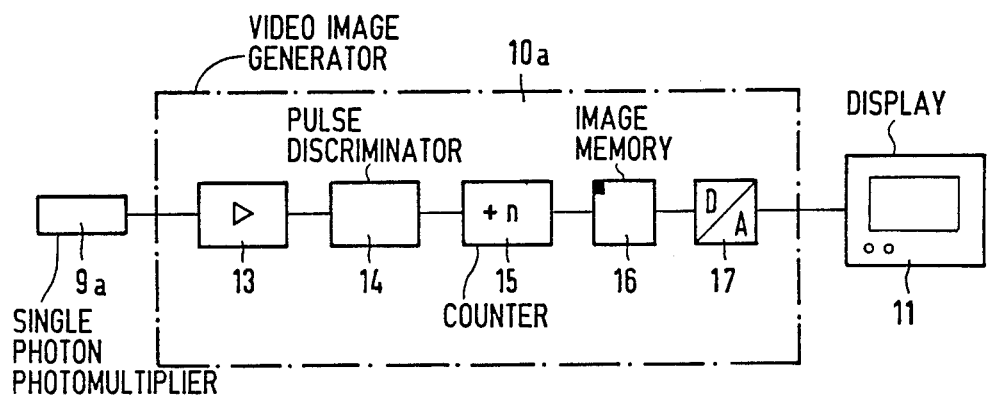
FIG. 3 is a block diagram showing the improvement of the present invention for use in the reading and visual display portion of the x-ray diagnostics installation.

The known transducer in the conventional circuit of FIG. 2 is, in the improvement disclosed herein, replaced by the transducer 9a shown in FIG. 3, which is a single-photon photo-multiplier. The photo-multiplier 9a generates one pulse for each light quantum incident on its light-sensitive entry face. The output pulses of this photo-multiplier 9a are supplied to a pulse amplifier 13, which is part of a video image generator circuit 10a, also constructed in accordance with the principles of the present invention. The output of the pulse amplifier 13 is supplied to a pulse discriminator 14. The output pulses of the pulse discriminator 14 are summed in a counter 15 for every picture element. The final reading of the counter 15 is entered in a memory location of an image memory 16 allocated to the picture element. A processing circuit (not shown) for processing the stored picture signal, as may be necessary, can be connected to the image memory 16. The output of the image memory 16 is supplied to a digital-to-analog converter 17, the output of which is supplied to the monitor 11 for visual reproduction of the x-ray image contained in the image memory 16.

By the operation of the single photon photo-multiplier 9a, each individual light quantum is acquired. This causes a pulse-like output signal of the photo-multiplier 9a. These pulses are amplified in the courrespondingly fast pulse amplifier 13, having a high band width, so that the pulses occurring per time interval can be acquired using a standard fast digital counter 15. The pulse discriminator 14 preceding the counter 15 suppresses any erroneous pulses caused by noise of the pulse amplifier 13 or the photo-multiplier 9a, these erroneous pulses having a lower pulse height in comparison to the useful pulses Using the components shown in FIG. 3, an image reproduction system is obtained wherein the noise of a photo-detector and analog amplifiers are avoided, as well as errors in the operation of an analog-to-digital convertor, which is not needed. The digital values generated by the counter 15 are independent of the characteristic of the detector and of the amplifier. An absolute measurement is thus undertaken, for which no calibration is required.

Although modifications and changes may be suggested by those skilled in the art it is the intention of the inventor to embody within the patent warranted hereon all changes and modifications as reasonably and properly come within the scope of his contribution to the art.

I claim as my Invention:

1. In an x-ray diagnostics installation having means for generating a latent image of an examination subject by irradiating the subject by irradiating the subject with x-rays and storing the resulting image in a luminescent image storage screen, and means for reading that latent image from said storage screen pixel-by-pixel by stimulating emission of photons from said storage screen and generating a video image therefrom on a video display, the improvement comprising:

a single-photon-multiplier having a light-sensitive entry face disposed with respect to said luminescent storage screen such that said photons therefrom are incident on said entry face, said single-photon multiplier generating one pulse for each photon incident on said light entry face and thereby generating a pulse sequence having a pulse rate dependent on the brightness incident on said entry face;

a counter connected to the output of said single-photon-multiplier which counts the pulses therefrom for each pixel;

means for storing the count for each pixel in a complete image; and means for converting the output of said means for storing to a signal suitable for said video display.

2. The improvement of claim 1, further comprising: a pulse amplifer connected to the output of said single photon multiplier before said counter.

3. The improvement of claim 1, further comprising: a pulse discriminator connected to the output of said single photon-multiplier before said counter.

* * * * *